Sept. 1, 1970
J. R. CAMPBELL
3,526,072
LOAD DISTRIBUTING SYSTEM FOR PANELS
INCORPORATING HONEYCOMB CORE
Original Filed Dec. 8, 1965
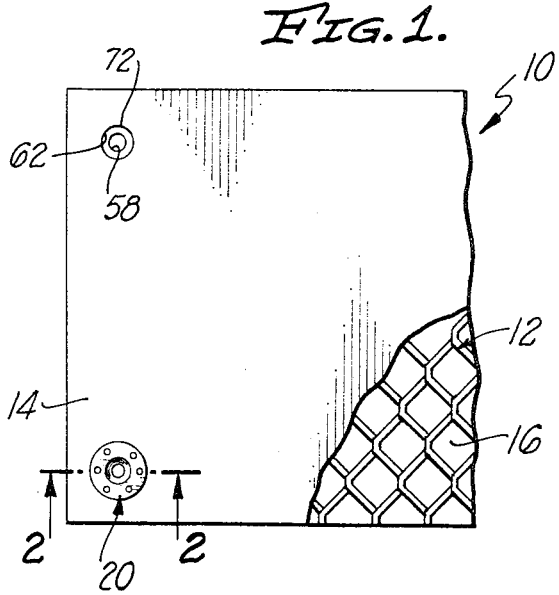
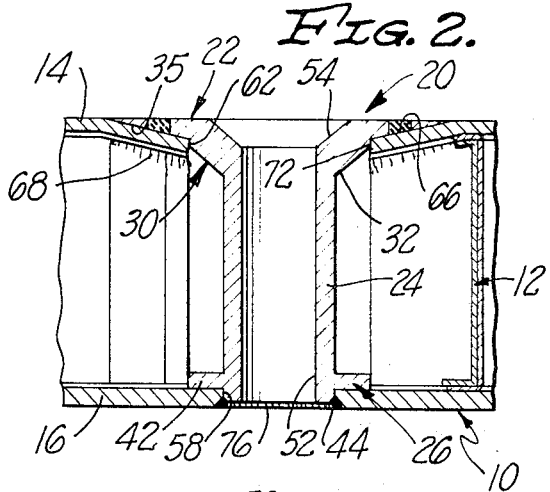
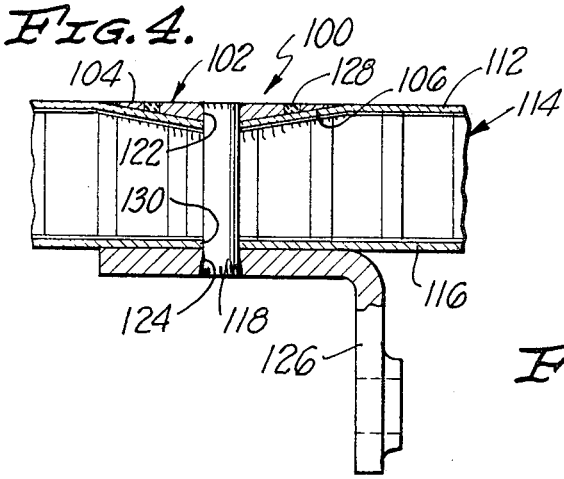
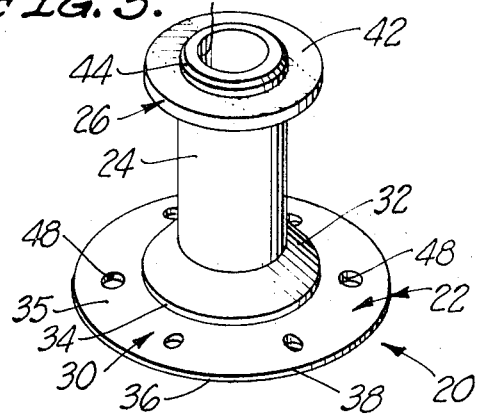
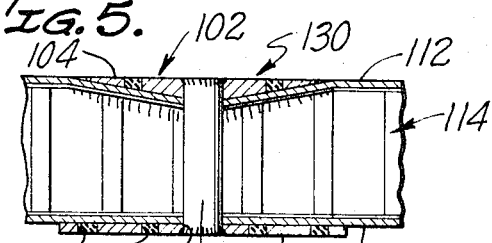
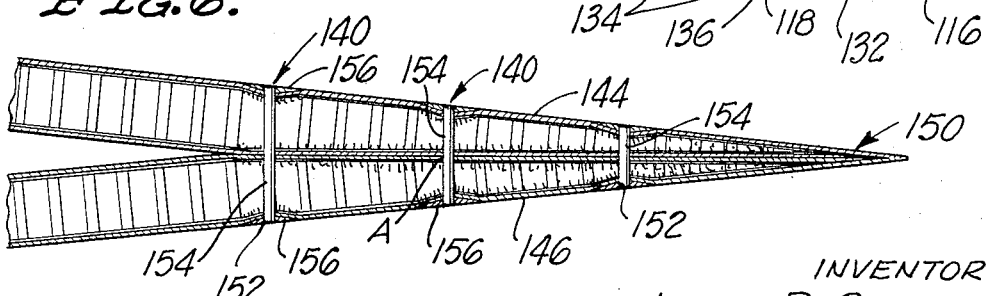
INVENTOR
JAMES R. CAMPBELL
BY
THOMAS P. MAHONEY
ATTORNEY

3,526,072
LOAD DISTRIBUTING SYSTEM FOR PANELS INCORPORATING HONEYCOMB CORE
James R. Campbell, 1504 Carmelita St.,
Laguna Beach, Calif. 92651
Continuation of application Ser. No. 412,374, Dec. 8, 1965. This application Mar. 29, 1968, Ser. No. 724,669
Int. Cl. E04c 2/36
US. Cl. 52—617                              2 Claims

ABSTRACT OF THE DISCLOSURE

A load distributing system for honeycomb core panels having surface sheets which includes a load distributing member having load distributing means overlying only the outer surface of one surface sheet and urged into engagement with the surface sheet to a sufficient extent to cause a depression in said one surface sheet corresponding to the configuration of the portion of said load distributing member engaging said one surface sheet. The load distributing member has a portion extending through openings in the surface sheet and the honeycomb core and securement means connects the surface sheet engaging portion of the load distributing member with the outer surface of the surface sheet. Also embraced within the disclosure is a method of securing the load distributing member to a honeycomb core panel having surface sheets where an elongated portion of the load distributing member is inserted in openings in said sheets and said core and another portion of the load distributing member is engaged with only the outer surface of the first surface sheet and is urged axially against the first surface sheet to form a cavity therein corresponding to the configuration of the other portion of the load distributing member.

BACKGROUND OF THE INVENTION

This application is a continuation of my copending application Ser. No. 512,374, filed Dec. 8, 1965, entitled "Load Distributing System for Panels Incorporating Honeycomb Core," now abandoned.

This invention relates to a load distributing system adapted to equally distribute loads imposed on a honeycomb core reinforced panel throughout the panel in order that the imposition of concentrated loads on the panel structure may be prevented and in order that the loads may be transmitted through the panel and load distributing system into associated supporting structures.

Advanced aircraft and missile technology entails the use of honeycomb core panels in various structural configurations where structural strength and reduced weight are concomitant and, in fact, inherent in the choice of the panel. Moreover, high speeds and temperatures encountered in slightly subsonic and supersonic aircraft and missiles entail the use of honeycomb core panels characterized by the incorporation of stainless steel honeycomb core and surface sheets on the opposite surfaces of said honeycomb core fabricated from stainless steel.

One of the major problems encountered in the use of stainless steel honeycomb core panels and other types of honeycomb core panels in various configurations has been the difficulty of providing means for attaching the panels in operative relationship with associated supporting structures and in distributing loads through the panel equally rather than permitting stress concentrations to occur because of the particular mode of affixation of the panels in operative relationship with the associated supporting structures.

While the teachings of the invention will be described as embodied in a honeycomb core panel structure in which the core is fabricated of stainless steel foil and the surface sheets of the panel are constituted by stainless steel, it will, of course, be obvious to those skilled in the art that the load distributing system of the invention may be applied with equal cogency to various types of panels fabricated from other materials, and it is, therefore, not intended that the teachings of the invention be limited to honeycomb core panels manufactured from any particular material or to honeycomb core panels fabricated in any specific design configuration.

However, to facilitate the consideration of the teachings of the invention, the structural principles and operation thereof will be described as utilized in conjunction with various aircraft configurations, such as thrust reverser doors adapted to be utilized in conjunction with jet engines to reverse the thrust efflux.

OBJECTS AND SUMMARY OF THE INVENTION

The load distributing system of the present invention is characterized by the provision of a load distributing member which is used in conjunction with honeycomb core reinforced panels having oppositely disposed surface sheets. The load distributing member incorporates a surface sheet engaging head for engaging only the outer surface of the first surface sheets and provided upon the head is a shank which passes through corresponding openings in the first and second surface sheets and core. The load distributing system includes the concept of driving the surface sheet engaging head into the first surface sheet to form a cavity in both the surface sheet and underlying core after which the surface sheet engaging portion and shank are secured, respectively, to adjacent portions of the first and second surface sheets. The invention also contemplates the method of installing the load distributing member which includes driving the surface sheet engaging head thereof axially against only the outer surface of the first surface sheet to form a recess or cavity in said first surface sheet and urging the shank of said member through corresponding openings in the surface sheets and core while forming the cavity. The surface sheet engaging portion and the shank of the load distributing member are then affixed to the first and second surface sheets by securement means.

It is, therefore, an object of my invention to provide a stress distributing or load distributing system which is characterized by the fact that it is adapted to be applied with ease to various types of honeycomb core or panel configurations and avoids stress concentrations in the panels which might result in structural failure thereof.

Another object of my invention is the provision of a load distributing system which contemplates the utilization of load distributing members or elements of various configurations which depend on the application in which the load distributing elements are utilized.

Another object of my invention is the provision of a load distributing system which entails only minor modifications of the associated honeycomb core panel structures and in which the load distributing members can be readily affixed in operative relationship with the associated honeycomb core panels by means of adhesives, weldments, or the like.

In applications where aerodynamic performance is critical, it is absolutely necessary that the surface configuration of the honeycomb core panels be maintained and that no excrescences be formed on the exposed surfaces of the panel.

Another object of my invention is the provision of a load distributing system of the aforementioned character in which the load distributing members are so applied to the corresponding surfaces of the honeycomb core panels that their surfaces are disposed in substantial coplanarity with the adjacent surfaces of the surface sheets, thus permitting optimum aerodynamic characteristics of the honeycomb core panel configurations to be maintained.

An additional and associated object of my invention is the provision of load distributing members which include surface sheet engaging portions adapted to be disposed in overlying relationship with said surface sheets and to be affixed in operative relationship therewith by various means, including adhesive means and weldments Another object of my invention is the provision of load distributing means of the aforementioned character in which the aforesaid load distributing members incorporate connecting portions extending through the core structure of the panels with which they are associated.

Another object of my invention is the provision of load distributing means of the aforementioned character wherein the flexural rigidity of the peripheral area of the surface sheet engaging portions is equal to or less than that of the surface sheet in the area involved, thus gradually blending the shear component of the load distribution into the surface sheet and preventing cracking or "punching" through of the surface sheet.

Another object of my invention is the provision of load distributing means of the aforementioned character which is particularly adapted for utilization in conjunction with a honeycomb core reinforced panel and which is operatively secured to the panel in such a manner as to prevent stress concentrations in the opposite surfaces of the panel and to encompass a substantial area of the core structure to pick up core shear. By controlled crushing of the honeycomb core underlying a portion of the load distributing means, the crushing of the core is permitted to taper gradually to zero at the perimeter of the associated portion of the load distributing means to provide equalized stress distribution.

Other objects and advantages of the invention will be apparent from the following specification and the accompanying drawing, which is for the purpose of illustration only.

BRIEF DESCRIPTION OF THE DRAWING

FIG. 1 is a fragmentary plan view of one embodiment of the load distributing system of the invention;

FIG. 2 is a transverse, sectional view taken on the broken line 2—2 of FIG. 1 and showing the application of one embodiment of the load distributing element or member incorporated in the system;

FIG. 3 is an isometric view of the load distributing element or member of FIG. 2;

FIG. 4 is a fragmentary, sectional view of yet another embodiment of the load distributing system of the invention;

FIG. 5 is a vertical, sectional view of another embodiment of the load distributing system of the invention; and FIG. 6 is yet another embodiment of the load distributing system of the invention.

DESCRIPTION OF THE BEST EMBODIMENTS CONTEMPLATED

Referring to the drawing and, particularly, to FIGS. 1–3 thereof, I show an embodiment of the load distributing system of the invention which includes a honeycomb core reinforced panel 10 incorporating a honeycomb structure 12 which has welded or otherwise secured to the opposite surfaces thereof face or surface sheets 14 and 16, the surface sheet 14 being referred to hereinbelow for purposes of convenience as the top sheet, and the surface sheet 16 being referred to as the bottom sheet.

Mounted in operative relationship with the panel 10 is a load distributing member or element 20 which may be fabricated from any suitable type of metal but which, in the present case, is fabricated from 17–4 pH solution annealed stainless steel. The load distributing element or member includes an upper surface sheet engaging portion 22 and a connecting portion 24.

In the present embodiment of the invention, the connecting portion 24 of the load distributing member 20 has a second surface sheet engaging portion 26 on its lower extremity for engagement with the inner surface of the bottom surface sheet 16, for a purpose which will be referred to in greater detail hereinbelow.

The basic configuration of the surface sheet engaging portion 22 of the load distributing member is that of a substantially circular head having an essentially frusto-conical undersurface 30 which is divided into an inner, annular section 32 having a perimetrical shoulder 34 thereupon and an outer annular section 35 which tapers outwardly gradually from said shoulder to an edge 36 which is provided with a radius 38, said edge being, for example, approximately .012 to .009 inch in thickness, but in any event equal to or thinner than the surface sheet 14. The angle of the outer section 35 of the underside 30 of the surface sheet engaging portion 22 of the load distributing member 20 is approximately 10° from the horizontal.

Providing the load distributing member with an edge whose thickness is approximately equal to or thinner than the surface sheet results in the attainment by said edge of a modulus of elasticity which is equal to or greater than the modulus of elasticity of the subjacent surface sheet 14. Consequently, when axial loads are imposed upon the load distributing matter, the edge 36 thereof will flex resiliently in conjunction with the flexure of the surface sheet 14, thus preventing penetration of the edge into the subjacent surface sheet 14 and consequent destruction of that area of the subjacent surface sheet 14. The relative proportions of the edge 36 of the surface sheet engaging portion 22 of the load distributing member and the subjacent surface sheet 14 are clearly shown in FIGS. 2 and 5 of the drawings.

In addition, it will be noted that the edge 36 is provided with a radius 38 which is an additional factor in preventing undesirable penetration of the edge 36 into the subjacent surface sheet 14. Moreover, the radius 38 coacts with the reduced edge 36 to prevent the imposition of a rupturing load upon the subjacent portion of the surface sheet 14.

The connecting or penetrating portion 24 of the load distributing member 20 is essentially cylindrical in configuration and may be considered to be the shank of the load distributing member 20.

The sheet engaging portion 26 is provided on the lower extremity of the connecting or penetrating portion 24 of the load distributing member 20 and is constituted by an annular flange 42. The lower extremity of the connecting or penetrating portion 24 of the load distributing member 20 is chamfered or beveled at 44, for a purpose which will be described in greater detail below.

Incorporated in the other tapered section 35 of the surface sheet engaging portion 22 of the load distributing member 20 is a plurality of apertures or openings 48 which facilitate the affixation of the load distributing member 20 to the contiguous area of the first surface sheet 14, in a manner to be described in greater detail below.

The load distributing member 20 incorporates an axial bore 52 which, as best shown in FIG. 2 of the drawing, includes an upper countersocket portion 54 adapted to receive the head of a correspondingly-shaped screw or bolt, not shown, which, in turn, will serve as a means for affixation of the panel in which the load distributing member is located to a desired supporting structure. However, if it is deemed necessary, threads may be provided in the bore 52 to eliminate the necessity for the use of a nut in association with the co-operating bolt.

Of course, a plurality of such load distributing members will be utilized in conjunction with a panel 10 which has been shaped into any desired configuration in order that the panel may be mounted in operative relationship with a suitable supporting structure. Therefore, the fragmentary view of the load distributing member 10 disposed in association the panel 14 is to be taken as merely exemplary of the mode of affixation thereof in operative relationship with said panel.

The affixation of the load distributing member in operative relationship with the panel 14 entails the drilling of a first hole 58 through the first and second surface sheets 14 and 16 and, of course, through the core structure 12 of the panel 10. After the first hole has been drilled, it is counterbored to provide a second hole 62 which terminates above the inner surface of the second surface sheet 16 but which provides a larger hole 62 through the upper surface sheet 14 and the core structure 12.

After the hole or openings 58 and 62 have been formed in the desired location in the panel 10, a load distributing member 20 is inserted in operative relationship with said holes by locating the connecting or penetrating portion 24 thereof in the counterbored hole 62. The diameter of the counterbored hole 62 is substantially equivalent to the diameter of the flange 42 constituting the second surface sheet engaging portion 26 of the load distributing member 20 and, thus, permits the passage of the flange 42 therethrough. However, the undersurface of the flange 42 engages the inner surface of the second or lower surface sheet 16 of the panel 10 permitting only the lower extremity of the shank constituting the connecting or penetrating portion 24 of the load distributing member 20 to enter the opening 58 in the lower or second surface sheet 16 and causing the underside of the flange 42 constituting the second surface sheet engaging portion 26 of the load distributing member 20 to engage the corresponding surface of the second or lower surface sheet 16, as best shown in FIG. 2 of the drawings.

However, the length of the shank constituting the connecting or penetrating portion 24 of the load distributing member 20 is such that the flange 42 cannot engage the inner surface of the lower surface sheet 16 until the surface sheet engaging portion 22 of the load distributing member 20 is urged into the surface sheet 14 to cause a depression or dimple 66 to be formed in said surface and to cause corresponding crushing, indicated at 68, FIG. 2, of the core structure 12 of the panel 10.

The extent of crushing of the core structure immediately adjacent the counterbore 62 is proportional to the taper of the outer section 35 of the surface sheet engaging portion 22 of the load distributing member 20, but is not sufficiently great to substantially permanently deform the panel in the area underlying the tapered section 35 of the surface sheet engaging portion 22 of the load distributing member 20. In this manner, a preload is obtained upon the area of the panel which is engaged by the surface sheet engaging portion 22 of the load distributing member 20 with consequent enhancement of the structural values of the load distributing system constituted by the operative co-operation between the load distributing member 20 and the relevant portion of the panel 10.

It will be noted that the perimetrical edge of the outer section 35 of the surface sheet engaging portion 22 of the load distributing member 20 is thinner than the corresponding surface sheet engaged thereby and, thus, because of the preloading achieved by the coining or dimpling of the surface sheet by the surface sheet engaging portion 22 of the load distributing member 20 and the reduced perimetrical edge thereof, stress concentrations between the perimetrical edge of the surface sheet engaging portion 22 of the load distributing member 20 and the panel 10 are substantially eliminated. The mechanical action between the perimetrical edge of the surface sheet engaging portion 22 of the load distributing member 20 and the contiguous areas of the surface sheet 14 and panel 10 may be compared to that of a hinge section or to the deflection of a diaphragm in relation to the surface to which it is engaged.

It will be noted that, as the load distributing member 20 is urged by pushing or pulling into the position of FIG. 2 of the drawing, the perimetrical edge 72 of the opening 62 in the upper surface sheet 14 is engaged upon the shoulder 34 provided by the perimeter of the centrally located tapered section 32 of the underside 30 of the surface sheet engaging portion 22 of the load distributing member 20.

The engagement of the perimetrical edge 72 of the opening 62 upon the shoulder 34 causes the load distributing member 20 to be properly located with respect to the opening 62 and the corresponding opening 58 and also insures that a portion of the load to which the load distributing member 20 is subjected will be carried into the surface sheet 14.

After the load distributing member 20 has been pushed into operative relationship with the panel 10 to an extent sufficient to firmly locate the undersurface of the flange 42 constituting the second surface sheet engaging portion 26 of the load distributing member 20 in contiguity to the upper surface of the lower surface sheet 16, the surface sheet engaging portion 22 of the load distributing member 20 is welded to the underlying portion of the upper surface sheet 14 of the panel 10. The welding process utilized is rosette or plug welding by the tungsten inert gas process. This is accomplished by welding at the apertures or openings to firmly secure the surface sheet engaging portion 22 of the load distributing member 20 to the upper surface sheet 14.

While I have described the use of rosette welding as a means of securing the load distributing member 20 to the upper surface sheet 14 it will, of course, be obvious to those skilled in the art that other expedients can be utilized to secure the load distributing member 20 in this operative relationship, among them being the use of high strength adhesives and blind riveting. The affixation of the surface sheet engaging portion 26 of the load distributing member 20 to the subjacent portion 14 of the surface sheet by welding or other means permits shear loads to be carried from the surface sheet engaging portion 22 of the load distributing member 20 into the subjacent portion of the upper surface sheet 14 and into the underlying crushed core structure immediately adjacent thereto.

Subsequently, weldments 76 are formed between the lower surface sheet 16 and the beveled extremity 44 of the connecting and penetrating portion 24 of the load distributing member 20. The weldments 76 are formed in spaced relationship with each other between the edge of the opening 58 in the lower surface sheet 16 and the beveled or chamfered lower extremity of the penetrating and connecting portion 24 of the load distributing member 20.

Once again, it is possible to secure the lower extremity of the penetrating and connecting portion 24 of the load distributing member 20 in operative relationship with the second, lower surface sheet by other means than welding. For instance, it is feasible to use high strength adhesives or alternative bonding means at this point.

Since the opposite extremities of the load distributing member 20 are maintained in operative relationship with the panel 10 by the weldment of the first surface sheet engaging portion 22 and second surface sheet engaging portion 26 to the respective upper and lower surface sheets 14 and 16, the connecting and penetrating portion 24 of the load distributing member 20 acts both in tension and compression as a positive means of connecting said upper and lower surface sheets 14 and 16. Therefore, the load distributing member 20 not only serves to connect the upper and lower surface sheets 14 and 16 of the panel 10 but, by the provision of the connecting and penetrating portion 24, greatly increases the strength of the panel where the load is to be applied thereto rather than reducing the strength of the panel, as is the case in many prior art devices.

After the completion of the affixation of the load distributing member 20 in the above described manner, a screw having a countersunk head may be inserted through the bore 52 until its upper extremity is flush with the corresponding surface of the load distributing member 20. A bracket or other securement member can then be located upon the undersurface of the lower surface sheet 16 and a nut then affixed to the protruding portion of the shank to complete the operation.

Among the advantages of the construction and mode of installation described hereinabove is the fact that the upper surface of the load distributing member is completely flush with the corresponding surface of the surface sheet. In addition, the provision of the thin perimetrical edge on the upper surface sheet engaging portion prevents the creation of stress concentration areas which would result in fatigue and ultimate failure of the panel in the area of the surface sheet immediately adjacent the perimeter of the surface sheet engaging portion thereof.

Furthermore, the reduced thickness of the perimetrical edge of the surface sheet engaging portion of the load distributing member further blends the vertical shear load into the upper or outer surface sheet 14 and the tapered underside outer section 35 of the surface sheet engaging portion 22 provides the transition zone wherein the thickness of the surface sheet engaging portion is not any greater than the thickness of the skin or surface sheet 14 to prevent the punching of a hole in the upper surface sheet 14.

Another essential result achieved by the load distributing system is that the upper surface sheet engaging portion 22 is, by its very nature of substantial diameter (1⅛ inches typical for a panel having .015 surface sheets) and thus encompasses a periphery of 1⅛ ×pi or over 3½ inches. As the core shear allowable in a typical panel 1 inch thick will be about 250 lbs. per inch, the portion 22 can safely carry a vertical load of 875 lbs. without deformation or failure. Ultimate load, in this case, would be 600 lbs.×3½ or 2100 lbs. As the lower surface sheet engages the attach bracket, which encompasses a considerable area, core shear from this side is handled with great ease.

Another desirable result achieved by the utilization of the load distributing system of the invention is the fact that the provision of two surface sheet engaging portions firmly secures the surface sheets to each other by the column effect, in tension, of the connecting and penetrating portion 24. Moreover, the inplane shear loads are picked up very efficiently and a leak tight joint between the corresponding portions of the load distributing member 20 and the contiguous surface sheets may be achieved. The perimetrical shoulder 34, engaged as it is by the adjacent edge of the opening 62 in the surface sheet 14, is also a factor in absorbing shear loads imposed upon the load distributing member 20.

Because the first surface sheet engaging portion 22 on the upper extremity of the load distributing member 20 further urges the loads into the panel, stress concentrations in the surface sheets are avoided. Moreover, the first surface sheet engaging portion encompasses a substantial area of the core to pick up core shear and blends the shear load by initially engaging, at its center, substantially crushed core and gradually blending out, at its periphery, to uncrushed core. Furthermore, problems encountered in the utilization of conventional honeycomb core fittings are eliminated because the load distributing member is, in a sense, utilized as a forming or dimpling tool which results in the proper affixation of the load distributing member 20 in operative relationship with the associated panel at all times, the mating surfaces being urged toward each other by the forces developed in the installation process. Welding the load distributing member 20 in operative relationship with the honeycomb core panel 10 with poor alignment of the load distributing member or with poor fitup is almost impossible.

Moreover, the installation of the load distributing member 20 can be accomplished with a minimum expenditure of time and labor. A problem with conventional attach means for honeycomb panels is that those capable of carrying heavy loads have to be installed in the panel prior to completion of a finish part; prior to forming, sizing, trimming, heat treat, etc. and thus the precise location of the attach means is almost impossible. With my invention, installation of the load distributing means is easily and effectively done as a final operation, allowing precise positioning relative to edges, curves, and general configuration.

An alternative embodiment 100 of the load distributing member of the invention is illustrated in FIG. 4 of the drawing and includes a head 102 constituted by an annular washer 104 which has a tapered undersurface 106. The edge of the washer 104 is a feather edge of no greater thickness than the thickness of the adjoining top surface sheet 112 of the associated panel 114 which also incorporates a lower surface sheet 116.

A pin 118 has its upper extremity welded in a centrally located opening 122 in the washer 104. The lower extremity of the pin 118 is welded in an opening 124 in a bracket 126 which serves to mount the panel 114 in operative relationship with an associated supporting structure.

The washer 104 incorporates a plurality of openings 128 which serve the same purpose as the welding openings 48 provided in the surface sheet engaging portion 22 of the previously discussed embodiment of the invention. However, the operative assembly of the load distributing member 100 with the associated panel 114 is slightly different from the operative securement of the previously discussed embodiment 20.

In the first place the pin 118 can be welded in operative relationship with the washer 104 prior to the affixation of the load distributing member 100 in operative relationship with the panel 114 or it can be secured in operative relationship with the washer 104 after the washer has been operatively connected by welding or other means to the associated top surface sheet 112.

In any event, prior to the association of the washer 104 in operative relationship with the top surface sheet 112, an opening 130 of a diameter substantially equal to the diameter of the pin 118 is formed through the surface sheets 112 and 116 and the core structure 132 of the panel 114.

After the opening 130 is formed, the washer 104 is forced into the surface sheet 112 to form a concavity therein which will leave the upper surface of the washer 104 disposed in substantial co-planarity with the outer surface of the surface sheet 112. The washer is then welded in operative relationship with the surface sheet 112 by rosette welding in association with the openings 128. Other means of affixation can be utilized, such as adhesives or blind riveting.

If the pin has not been previously welded to the washer 104, it is now inserted into operative relationship with the hole with its lower shank projecting below the lower surface sheet 116 and the upper extremity of the pin 118 is welded in the aperture 122 in the washer 104 and the upper extremity thereof burned therefrom until it is coplanar with the remaining surface of the washer 104.

Subsequently, the lower extremity of the pin 118 is welded in the opening 124 to secure the bracket 126 in operative relationship with the undersurface of the lower surface sheet 116.

An alternative embodiment 130 of the invention is shown in FIG. 5 of the drawing and is basically similar to that previously discussed as embodiment 100 with the exception that a doubler plate 132 is substituted for the bracket 126. The doubler plate 132 incorporates a plurality of openings 134 which permit it to be rosette welded in operative relationship with the underside of the lower surface sheet 116.

The doubler plate 132 can be utilized as a means of reinforcing an associated surface sheet and the lower extremity of the pin 118 is welded in operative relationship with an opening 136 formed therein.

Illustrated in FIG. 6 of the drawing is the utilization of a load distributing member 140 constructed in accordance with the teachings of the invention to join two honeycomb core reinforced panels 144 and 146 in operative relationship with each other to provide a trailing edge 150 on the wing of an aircraft.

The overlying extremities of the sheets 144 and 146 have been crushed under heat and pressure to provide tapering core sections and have been drilled to provide openings 152 for the reception of tacking pins 154 which are associated with washers 156 essentially similar in function to the washers 104 and the connecting pins 118 of the load distributing member 100 of the invention disclosed in FIG. 4 of the drawing.

After the holes have been drilled in the overlying tapered portions of the panels 144 and 146, the washers 156 are driven into operative relationship with the adjacent surface sheets to form concavities therein. The extremities of the pins 154 are then burned by welding into openings in the washers 156 to secure the tapered sections in operative relationship with each other. It may be desirable to size the holes in the abutting surface sheets at A, FIG. 6, such that pins 154 are a press fit therein.

I thus provide by my invention various embodiments of a load distributing system which includes load distributing members adapted to maintain honeycomb core panels in operative relationship with adjacent supporting structures or in operative relationship with each other. The teachings of my invention achieve the maintenance of aerodynamic contours and the transmission of loads through and into structures ordinarily considered too fragile to sustain such loads.

I claim:

1. In a load distributing system for distributing loads into a honeycomb core structure including opposed surface sheets having openings therein corresponding to an opening in said honeycomb core, the combination of: a load distributing member having a head portion urged into contact with only the outer surface of one surface sheet with sufficient force to form a cavity in said one surface sheet and said core corresponding generally to the configuration of said head portion, said head portion being tapered to impart a reduced cross section to a perimetrical edge thereof disposed in contiguity to an adjacent area of said one surface sheet and the original configuration of said head portion remaining substantially unchanged after said cavity is formed, said perimetrical edge being at least as resilient as the subjacent portion of said surface sheet, said load distributing member having a shank portion on said head portion, said shank portion being of uniform diameter throughout its length and extending through openings in said one surface sheet, said core and the other surface sheet; weldments connecting said head portion of said load distributing member and said one surface sheet in operative relationship with each other; and a securement plate connecting the end of said shank portion to the other surface sheet, said securement plate having a central opening of the same diameter as said shank portion and being welded to said shank portion at the perimeter of said central opening, said plate being welded to the exterior surface of said other surface sheet remotely from the edge of said central opening in said plate.

2. In a method of securing a load distributing member having a head and a shank, said shank being of uniform diameter throughout its length, in operative relationship with a panel incorporating a honeycomb core having first and second surface sheets secured to opposite sides of said honeycomb core, the steps of: providing corresponding openings through said surface sheets and said core; locating said shank of said load distributing member in said openings; placing the head portion of said load distributing member in engagement with only the outer surface of said first surface sheet, urging said head portion axially against said first surface sheet to form a cavity therein corresponding generally to the configuration of said head portion of said load distributing member while retaining the initial shape of said head portion and crushing said core structure beneath said head portion to cause the lower end of said shank to protrude through said opening in said second sheet; welding said head portion in operative relationship with said first surface sheet; and affixing said shank portion to said second surface sheet by securing a securement plate having a central opening to the protruding extremity of said shank portion by welding the edge of said central opening to said shank portion and subsequently welding said plate to the exterior surface of said second surface sheet remotely from the edge of said central opening in said plate.

References Cited

UNITED STATES PATENTS

| 1,113,981 | 10/1914 | Gaillor | 151—41.7 X |
|---|---|---|---|
| 2,607,447 | 8/1952 | Tuttle | 52—617 |
| 2,784,758 | 3/1957 | Rohe. | |
| 2,961,760 | 11/1960 | Horton et al. | 52—615 X |
| 2,967,593 | 1/1961 | Cushman. | |
| 3,008,552 | 11/1961 | Cushman et al. | 52—617 |
| 3,041,912 | 7/1962 | Kreider et al. | 52—617 |
| 3,042,156 | 7/1962 | Rohe. | |
| 3,137,887 | 6/1964 | Mannino et al. | 52—617 X |
| 3,147,832 | 9/1964 | Saro | 52—621 X |
| 3,173,520 | 3/1965 | Fisher | 52—309 |
| 3,285,311 | 11/1966 | Cushman | 52—617 X |
| 3,296,765 | 1/1967 | Rohe et al. | 52—617 |

FOREIGN PATENTS

| 1,254,770 | 1/1961 | France. |
|---|---|---|
| 775,187 | 5/1957 | Great Britain. |

ALFRED C. PERHAM, Primary Examiner

U.S. Cl. X.R.

29—452; 151—41.7